(12) United States Patent
Contractor

(10) Patent No.: US 6,831,563 B1
(45) Date of Patent: Dec. 14, 2004

(54) LOCATION VISIT CONFIRMATION SERVICES FOR WIRELESS DEVICES

(75) Inventor: Sunil H. Contractor, Marietta, GA (US)

(73) Assignee: BellSouth Intellectual Property Corp., Wilmington, DE (US)

( * ) Notice: Subject to any disclaimer, the term of this patent is extended or adjusted under 35 U.S.C. 154(b) by 622 days.

(21) Appl. No.: 09/811,563

(22) Filed: Mar. 20, 2001

(51) Int. Cl.[7] .............................................. G08B 23/00
(52) U.S. Cl. ................................. 340/573.1; 340/539.1
(58) Field of Search .......................... 340/573.1, 539.1, 340/306, 3.3; 705/8–11; 700/111

(56) References Cited

U.S. PATENT DOCUMENTS

| | | | | |
|---|---|---|---|---|
| 3,577,079 A | * | 5/1971 | Horstmann et al. | 340/525 |
| 4,296,408 A | * | 10/1981 | Neuringer | 340/539.13 |
| 4,658,357 A | * | 4/1987 | Carroll et al. | 705/32 |
| 5,120,942 A | * | 6/1992 | Holland et al. | 235/376 |
| 5,168,500 A | * | 12/1992 | Naito et al. | 714/716 |
| 5,572,192 A | * | 11/1996 | Berube | 340/574 |
| 5,666,585 A | * | 9/1997 | Nagira et al. | 399/10 |
| 6,078,255 A | * | 6/2000 | Dividock et al. | 340/539.1 |

OTHER PUBLICATIONS

Geographic Information Services, www.volusia.org/gis.
AOA Location Technology, www.911dispatch.com/911_file/aoa.html.
First US Wireless 911 Location System Trialed Apr. 28, 1999, www.findarticles.com/m0NEW/1999_April_28/54506755/p1/article.jhtml.
Federal Communications Commission News Release dated Nov. 18, 1999, "FCC Acts To Remove Barriers Impeding Enhanced Wireless 911 Services," www.fcc/gov/Bureaus/Wireless/News_Releases/1999/nrw19046.html.
Dispatch Monthly, www.911dispatch.com/911_file/wireless911.html.
Telident, www.telident.com
E911 Telecommunications Consulting, www.911etc.com.
Cellular Networking Perspectives (May, Jun. and Jul. 2000).
FCC Report and Order (FCC 96–264), dated Jul. 26, 1996.
FCC Report and Order (FCC 99–245), dated Oct. 6, 1999.
About GIS, www.esri.com/library/gis/index.html.
USGS National Mapping Information, www.mapping.usgs.gov/www/gnis.

* cited by examiner

Primary Examiner—Thomas Mullen
(74) Attorney, Agent, or Firm—Merchant & Gould LLC

(57) ABSTRACT

A location visit confirmation service includes a portable wireless device, a schedule of predetermined sites, a location identification device and a central processor. The central processor periodically receives position data generated by the location identification device identifying the location of the portable wireless device. The central processor compares this position data to the schedule of predetermined sites. Using a threshold based on distance, or distance and time, it is determined whether a service person completed a visit to one of the sites in the schedule. At the end of the site visit confirmation evaluation period, a summary report is generated that confirms those scheduled site visits that were completed. The summary report is provided by the wireless carrier to the subscriber.

60 Claims, 6 Drawing Sheets

LOCATION VISIT CONFIRMATION SUMMARY REPORT FOR XYZ CORP. — 310

DATE: MARCH 15, 2001 — 315

| SITE VISIT | STREET ADDRESS | POSITION | EXPECTED TIME | VISIT CONFIRMED | TIME |
|---|---|---|---|---|---|
| 1 | 15 FIRST STREET | L1, L2 | 0800 | Y | 0817 |
| 2 | 27 SECOND STREET | L3, L4 | 0930 | N | --- |
| 3 | 80 SEVENTH STREET | L5, L6 | 1015 | Y | 1032 |
| 4 | 11 TWELFTH AVE. | L7, L8 | 1145 | Y | 1215 |
| 5 | 29 TWENTIETH AVE. | L9, L10 | 1330 | Y | 1320 |
| 6 | 6 THIRD STREET | L11, L12 | 1530 | N | --- |
| 7 | 9 FOURTEENTH AVE. | L13, L14 | 1700 | Y | 1716 |

LOCATION VISIT CONFIRMATION SERVICES FOR WIRELESS DEVICES

FIELD OF THE INVENTION

The present invention relates to methods and apparatus for providing confirmation of visits by service personnel carrying wireless devices to predetermined locations, as well as the gathering of data describing those visits.

BACKGROUND OF THE INVENTION

It is common for business organizations providing services to customers to have a large number of service persons who undertake on-site visits for deliveries, repairs, installations, maintenance, and related service tasks. A wide range of businesses provide such on-site services, including computer manufacturers/retailers, appliance manufacturers/retailers/repairers, car detailers, cable companies, telephone companies, carpet installers and cleaners, and so forth. The list continues to grow as providing quality service increasingly becomes the touchstone for competing effectively in the marketplace for many businesses.

Typically, each individual providing on-site visits ("service person") is provided a list of sites to visit and, perhaps, a description of what service is to be provided (e.g., install a second cable box). The service person may also be provided with a tentative appointment time or window (e.g., 2:30 p.m. or anytime between 1:00–5:00 p.m.). The service person then travels by car or van to each site to provide the needed service.

Typically, the service person will have a cellular phone and/or pager device so that he/she can periodically check in with, or receive calls from, the home office. For example, after each scheduled site is visited, the service person may call in to confirm that the site visit is complete and to report that the service person is proceeding to the next scheduled site. The service person may also call in the amount of time spent at the site so that a bill can be prepared. Alternatively, the service person may fill out an invoice form on-site so that it can be handed to the customer. The service person will return to the home office with copies of those invoices at the end of the day.

Unfortunately, there are a number of significant drawbacks to the conventional approach for providing on-site services. For example, the home office has no immediate avenue for confirming that a scheduled site visit actually took place. Instead, the home office must largely depend on the professionalism and honesty of the service person who confirms, explicitly or implicitly, that each site visit actually was made.

Sometimes missed appointments may be discovered through customer complaints, but this is not completely effective (and a service organizations' goal is to avoid customer complaints, of course). Especially in the case where visits are not accompanied by a charge, it is not uncommon for a customer to ignore a no-show or simply forget to lodge a complaint. For example, it is not uncommon for cable service persons to miss appointments without repercussions. In fact, a customer may not even be present at the site (e.g., the customer may be absent because he/she is at work). A more troubling scenario would be an electrical meter reader who skips visits and makes up a nominal reading for the resident. The missed visits and accompanying fraud might not be detected for a long period of time.

Even if a customer eventually complains about a service person missing appointments, a significant period of time may pass before the problem is identified. During that period, there may be a significant loss of customer goodwill as a result. This is a significant drawback.

In sum, there are significant drawbacks to existing approaches for confirming site visits by service personnel.

Moreover, conventional approaches to ascertaining the details of a visit have significant drawbacks. For example, the time spent at a site may be important for purposes of billing and for purposes of determining service efficiency. According to the conventional approach, determining the time spent depends largely on the good (and accurate) word of the service person. As before, customer complaints provide one avenue for identifying fraud or inaccuracy; however, as discussed above, this can be an inefficient mechanism for identifying problems. This is especially the case when the customer is not present or when the visit is not a pay visit. Accordingly, present approaches to identifying the details of a site visit have significant drawbacks.

Finally, present approaches to confirming site visits and gathering site visit details (such as time spent) do not facilitate the gathering of global statistics. Present approaches provide for confirmation and detail data to be gathered in a largely manual, non-automated, and somewhat haphazard manner. Accordingly, aggregating and processing this data to determine overall service levels and efficiencies is not a straightforward process. For large service providers in extremely competitive markets, or for service providers with extremely narrow profit margins, this is a significant disadvantage.

SUMMARY OF THE INVENTION

The present invention is a location visit confirmation service, typically provided by a wireless carrier to a subscriber. The location visit confirmation system includes a portable wireless device, a schedule of predetermined sites, a location identification means (such as a GPS unit on the portable wireless device) and a central processor. The central processor periodically receives location data generated by the location identification means that describes the location of the portable wireless device. The central processor compares a position based on the location data to the schedule of predetermined sites. Using a threshold based on distance, or distance and time, it is determined whether a service person completed a visit to one of the sites in the schedule. At the end of the site visit confirmation evaluation period, a summary report is generated that confirms those scheduled site visits that were completed. The summary report is provided by the wireless carrier to the subscriber.

The advantages of the present invention are numerous. The invention generally discourages unethical behavior by employees. The location visit confirmation service permits a subscriber to confirm scheduled site visits in an accurate manner. An additional advantage is that the confirmation is largely automated and, accordingly, places little burden on the subscriber home office, the service person, or the customer. Finally, the location visit confirmation service enables the identification of missed appointments and the identification of problem employees without depending on customer complaints. Because problems can be addressed before customer complaints are lodged, the present invention can mitigate the loss of goodwill that sometimes accompanies missed appointments. Other benefits and advantages exist.

Accordingly, an object of the invention is to provide a location confirmation service that confirms scheduled site visits in an accurate manner.

Another object of the invention is to provide a location confirmation service that confirms scheduled site visits in a largely automated fashion.

Another object of the invention is to provide a location confirmation service that permits identification of missed appointments without depending on customer complaints.

These and other objects of the present invention are described in greater detail in the following description of the invention, the appended drawings, and the attached claims.

BRIEF DESCRIPTION OF THE DRAWINGS

FIG. 3 provides an example of a site visit summary report that could be prepared based on the processing of the schedule and location information acquired regarding the position of a portable wireless device.

DETAILED DESCRIPTION OF THE INVENTION

Figure 1:
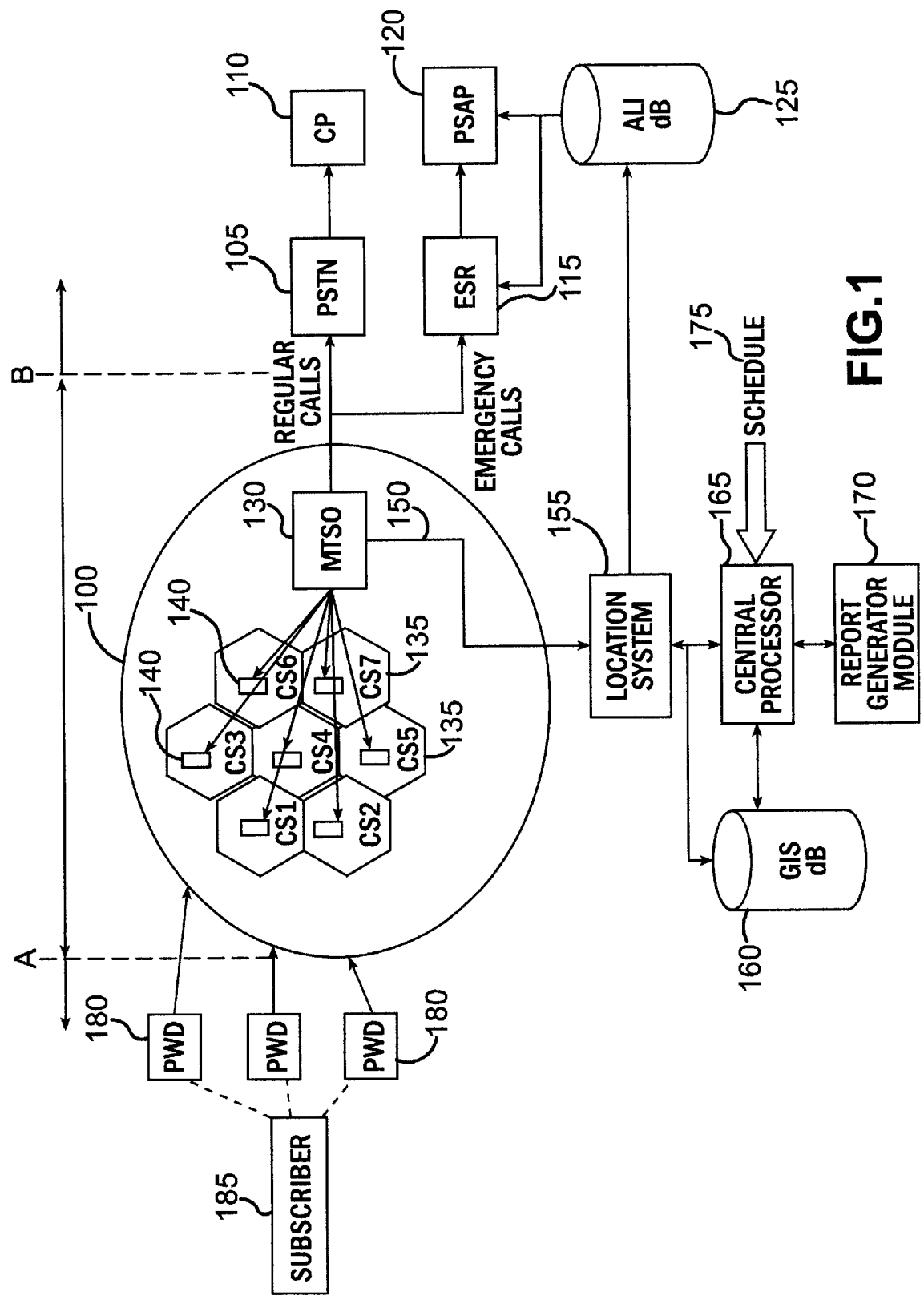
FIG. 1 provides a block diagram for a system for confirming site visits and providing site visit details according to an embodiment of the invention.

FIG. 1 is a block diagram, according to an embodiment of the invention, for a system that confirms site visits and/or that provides site visit details. By way of overview, referring to lines A and B, those elements to the left of line A relate to a subscriber of the service, which may be provided by a wireless carrier, as indicated by the elements between A and B. The area in FIG. 1 to the right of line B relates to the conventional telephone network, sometimes referred to as the Plain Old Telephone System or "POTS."

Beginning with the area to the left of line A, subscriber 185 is a subscriber who wishes to receive site visit confirmations and/or site visit details. Subscriber 185 may be a cable service, carpet cleaner/installer, car detailer, phone company, or any other entity which employs service personnel who visit predetermined sites to deliver a product or provide a service. Accordingly, during a business day subscriber 185 will send one or more service persons equipped with portable wireless devices 180 out into the field to make the predetermined site visits.

The portable wireless devices 180 could be any two-way device that permits the position of the device to be localized using one of several localization technologies, to be discussed below. Accordingly, portable wireless device 180 could be a cellular phone, a two-way pager, a personal data assistant (PDA), or other two-way transceiver type device that is portable and that permits localization. While portable wireless device 180 is preferably handheld, it could alternatively be installed in a vehicle.

Portable wireless device (PWD) 180 interfaces with cellular network 100, which could be a digital or analog system. Both digital and analog cellular systems are well known in the art, including the particular types of cellular systems such as TDMA (time division multiple access) systems, CDMA (code division multiple access) systems, FDMA (frequency division multiple access) systems, GSM (global system for mobile communications), and so forth.

Cellular network 100 typically includes a number of cell sites 135 (sometimes referred to as base stations) having cell transceivers 140. Transmissions by portable wireless device 180 are generally received by the most proximate transceiver 140, which forwards the transmission to mobile telephone switching office (MTSO) 130. In reciprocal fashion, transmissions by other cellular phones, or from phones in the POTS system, are transmitted from MTSO 130 to the most proximate transceiver 140, which forwards the transmissions on to PWD 180. As PWD 180 moves, or as the signal strength becomes stronger at a new cell site 135, the call may be handed off from a first cell site 135 to a second cell site 135 without an audibly noticeable effect on the call.

It should be noted while MTSO 130 routes the call through a particular cell site 135 (because it is the cell site most proximate to the PWD 180), a number of other cell sites 135 may also be receiving signals from PWD 180. For example, a PWD 180 in the center of cell site CS1 135 normally has its call routed through that cell site's transceiver 140. However, a number of other cell sites 135 may also be receiving the transmission of PWD 180, albeit at a diminished signal strength. Accordingly, cell sites CS2, CS3, CS4 and CS5 135 may also be receiving a signal from the PWD 180 located in the center of CS1 135. This attribute of cellular network 100 is important to certain localization techniques, as discussed below.

MTSO 130 interfaces with the POTS telephone system for both regular calls and emergency calls. For a regular call, MTSO 130 interfaces with local exchange carriers (LECs) and interexchange carriers (IXCs) in order to complete local and long distance calls to a called party 110. The hierarchy of switching offices (e.g., classes 1–5 for a regional office down to an end office) and switching control techniques (e.g., CCIS or Common Channel Interoffice Signaling [SS7]) that may be involved in completing these calls are well understood in the art.

For emergency calls, MTSO 130 interfaces with an emergency services router (ESR) 115 in order to route an emergency (911) call to the proper public service answering point (PSAP) 120. PSAPs 120 are generally public emergency call centers, although some may be privately maintained call centers, such as might exist at a security office on a campus. Although not depicted in FIG. 1, in many cases MTSO 130 routes both regular and emergency calls to PSTN 105, which functions as ESR 115 for routing of the emergency calls.

When a 911-type call is made from a wire line phone, the emergency call routing system has readily available information for determining the correct PSAP 120 to which the call should be routed. For example, the calling number can be identified using automatic number identification (ANI) and then the calling number can be correlated to the closest PSAP 120. Usually a database, such as automatic location identification (ALI) database 125, is accessed by PSAP 120 to identify a street address corresponding to the calling number.

However, when a 911-type call is made from a portable wireless device 180, special problems arise. Even if the cellular calling number (e.g., the mobile identification number [MIN] and/or electronic security number [ESN]) and a billing address can be identified, this information is of little benefit. This is because the device is portable and neither the MIN nor the billing address indicates the location of the PWD 180 at that moment. Accordingly, the POTS emergency system does not know where (i.e., to what PSAP 120) to route the call, nor does the emergency system know where (i.e., to what street address) to direct emergency personnel such as the police or an ambulance.

The Federal Communications Commission (FCC) has issued a series of orders addressing this issue. These orders mandate that wireless providers begin supplying location information to PSAPs in order to support an enhanced 911 (known as "E911") capability for portable wireless devices. According to the FCC mandate, wireless providers must provide a Phase I capability in 2000, followed by a more robust Phase II capability in 2001. For the interested reader, the FCC orders can be found at the web sites www.fcc.gov/Bureaus/Wireless/Orders/1996/fcc96264.txt and www.fcc.gov/Bureaus/Wireless/Orders/1999/fcc99245.txt.

The Phase I capability requires that wireless providers provide ANI information (calling number of PWD), as well as general location information. The general location information would locate the PWD to within a cell site or cell sector.

In Phase II, the wireless providers must provide specific location information. Recognizing that localization techniques may be network-based or handheld-based (discussed below), the Phase II localization accuracy requirements are broken out accordingly. For network-based localization solutions, the accuracy must be at least within 125 m at a one standard deviation probability (67%) and at least within 300 m at two standard deviations (95%). For handheld localization solutions, the accuracy must be at least within 50 m at one standard deviation and at least within 150 m at two standard deviations.

As a result of the FCC orders for E911, a number of specific techniques for localizing PWDs have been developed and tested. Network-based solutions include TDOA (time difference of arrival), AOA (angle of arrival), TDOA/AOA in combination, and LPM (location pattern matching). The selection of hardware and coding of algorithms to implement these known techniques for a particular wireless carrier is well within the skill of the ordinary artisan.

TDOA localization relies on the fact that a signal transmitted by a PWD is typically received at multiple cell site transceivers 140 at slightly different times. If the signal is received at three cell site transceivers 140, the differential timing information can be used to compute a latitude/longitude for the PWD 180. Accordingly, referring to FIG. 1, the differential timing information may be sent from MTSO 130 to location system 155, which computes a latitude/longitude (or Cartesian X-Y) solution based on the differential timing information. In an E911 application, the latitude-longitude (or X-Y) pair is transmitted to ALI dB 125 so that it can be accessed by PSAP 120 for directing emergency personnel. In so doing, ESR 115 or PSAP 120 may access a street address database (not shown), such as a geographic information system (GIS) database, in order to convert the latitude-longitude (X-Y) pair to a street address.

AOA localization relies on the fact that a signal transmitted by a PWD 180 is typically received at different angles at multiple cell site transceivers 140. Using direction-finding (compass) circuitry at cell sites 135, the angle of arrival is computed at the cell site transceivers 140 receiving the signal. By processing the angles of arrival, a latitude and longitude can be computed by location system 155 for PWD 180. Accordingly, referring to FIG. 1, the angle of arrival information may be sent from MTSO 130 to location system 155, which computes a latitude/longitude (or Cartesian X-Y) solution based on the angle information. In an E911 application, the latitude-longitude (or X-Y) pair is transmitted to ALI dB 125 so that it can be accessed by PSAP 120.

TDOA/AOA is a combined approach that relies on a synthesis of the TDOA and AOA techniques. In this approach, coordinate pairs may be computed for both the TDOA and AOA techniques. The two coordinate pairs may then be averaged or otherwise combined. On the other hand, this approach may provide for selecting one or the other technique in some circumstances. For example, the TDOA technique requires that the signal be received at a minimum of three cell site transceivers 140. If the signal is received at only two cell site transceivers, the AOA technique can be used because a position may be computed based on two angles of arrival. Referring to FIG. 1, the combined approach could be implemented by MTSO 130 passing the timing and angle information to location 155, which computes the coordinate pair solution. The coordinate pair is passed to ALI dB 125 so that PSAP 120 can direct emergency personnel as previously discussed.

The location pattern matching (LPM) technique has been proposed for urban environments in which tall buildings and other obstructions cause signal reflection and multipath phenomena. In LPM, the signal of PWD 180 is received at multiple CS transceivers 140. The acoustic component of the signal is then analyzed and compared to a database of signal characteristics. The processing and database comparison permit signal anomalies such as multipath and echoes to be used to localize PWD 180. For E911, the resulting coordinate pair is sent to ALI dB 125 and call routing to PSAP 120 occurs as before.

Turning to handheld localization, the most promising technique relies on the global positioning system (GPS). The well-known GPS localization technique relies on a constellation of satellites that transmit position and timing information that can be received by a GPS receiver. If the GPS receiver can receive transmissions from four satellites, a GPS localization fix can be calculated by computing the range from the GPS receiver to each satellite. In the GPS implementation for E911, each PWD 180 includes a GPS receiver for receiving GPS satellite signals.

In one embodiment, the GPS receiver in the PWD 180 includes the GPS processing for computing the latitude/longitude pair, which can be transmitted to MTSO 130. In this embodiment, location system 155 could be eliminated because the localization computation is performed at PWD 180. Accordingly, the coordinate pair could be collected at MTSO 130 and forwarded on to ALI dB 125.

In another embodiment, the GPS receiver in PWD 180 might not include the GPS processing algorithm. Instead, the raw GPS data may be collected at MTSO 130 and forwarded on path 150 to location system 155. Location system 155 performs the GPS computation to generate a latitude/longitude pair that is sent to ALI dB 125.

The block diagram of FIG. 1 is functional in nature and is, therefore, but one example of how the overall system architecture may be designed. In particular, MTSO 130 and location system 155 are shown in FIG. 1 to clearly illustrate the mobile switching operation of the one and localization operation of the other. However, MTSO 130 and location system 155 could easily be combined or further subdivided. For example, the localization processing performed by location system 155 could alternatively be performed by and integrated into MTSO 130.

In an alternative embodiment of the system of FIG. 1, some or all of the components related to the cellular network 100 (in the area between lines A and B) and the Public Switched Telephone Network (PSTN, in the area to the right of line B) might be excluded. This embodiment could rely on any wireless technology permitting communication among portable devices outside of the cellular network and PSTN, such as the well-known "Bluetooth" technology.

Bluetooth provides a standard protocol for synchronizing data exchanged between a wide variety of devices, including smart phones, smart pagers, handheld PC's, desktop computers, mobile computers, and so forth. Bluetooth uses an unlicensed portion of the frequency spectrum to provide a short-range wireless link among such devices. Bluetooth can be implemented with chips having two-way transmitters that are integrated into the device. Bluetooth has been heralded for making possible the fusion of the Internet, mobile telephony, and mobile computing.

Referring to FIG. 1, in the alternative embodiment a technology such as Bluetooth could be used by subscriber 185 to set up a so-called "Wireless LAN" (WLAN) or "Personal Area Network" (PAN). PWDs 180 could be portable wireless devices that are Bluetooth-enabled. These Bluetooth-enabled PWDs 180 might be carried by service persons. These Bluetooth-enabled PWDs 180 could communicate with another Bluetooth-enabled device, for example, a remote processor (not shown) replacing cellular network 100. Remote processor 99 could be a personal computer, laptop, or other portable device that would forward collected data for further processing. Remote processor 99 could be located in a van in the field. In this embodiment, subscriber 185 would not have to rely on a wireless carrier to provide localization services. Location system 155 and central processor 165 could be provided by subscriber 185 or a third party.

In the alternative embodiment described above, it is preferable that localization be performed using a handheld (e.g., GPS) localization technique. If subscriber 185 operates a WLAN or PAN outside of the cellular system, network-based localization techniques may not be available.

In a variation of this alternative embodiment, the remote processor 99 with which P. Bluetooth-enabled PWDs 180 communicate could be disposed between PWDs 180 and cellular network 100. In this variation, Bluetooth-enabled PWDs 180 would transmit data to remote processor 99 over a Bluetooth frequency. The remote processor 99 could then download the data using any available means (e.g., an e-mail or file sent over cellular network 100).

The exemplary E911 localization techniques described previously in connection with FIG. 1, or any other localization techniques, can be used for providing site visit confirmation services and for providing site visit details services. Other customized services could be provided. As shown in FIG. 1, a schedule of predetermined sites 175 to be visited by a service person is input to central processor 165. The content of schedule 175 originates with subscriber 185.

In one embodiment, subscriber 185 provides the plurality of predetermined sites in the form of street addresses and/or phone numbers. Central processor 165 then converts the street addresses and/or phone numbers (by looking up a corresponding street address using a database) to latitude/longitude (or X-Y) pairs. Central processor 165 may do this by accessing street address conversion database 160, which may comprise a geographic information system (GIS) database, well known in the art.

In an alternative embodiment, subscriber 185 may provide the predetermined sites already in the form of latitude/longitude (or X-Y) pairs so that the provider of the confirmation service need not perform the conversion. It should also be noted that the content of schedule 175 may be transmitted by subscriber 185 to central processor 165 via paper mail, facsimile, e-mail, the Internet, or any other suitable means.

Figure 2:
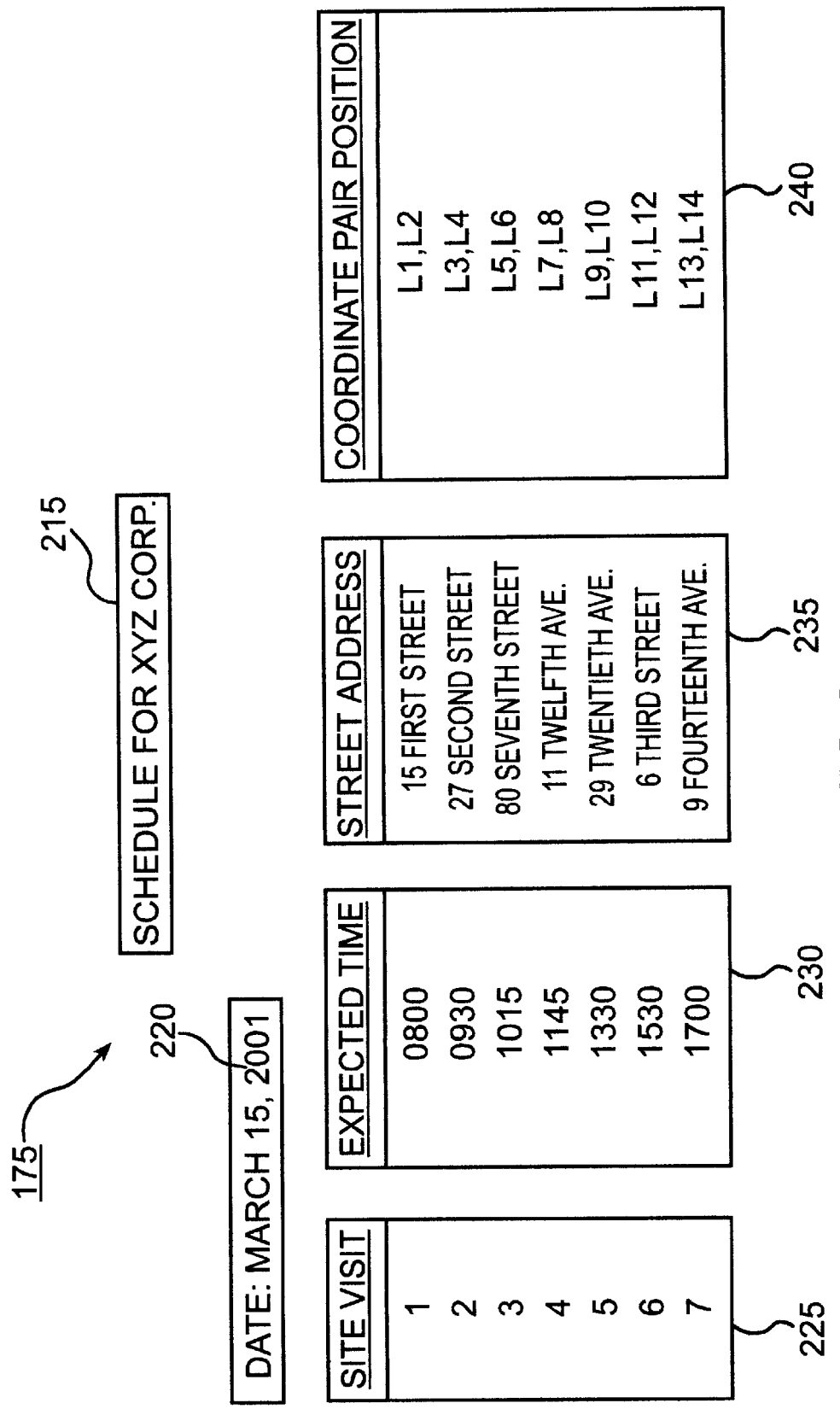
FIG. 2 provides an example of a schedule that might be input into the system for confirming site visits.

FIG. 2 provides an exemplary schedule 175 for the predetermined sites that a service person is scheduled to visit. As suggested above, schedule 175 could be generated by subscriber 185 completing a Web page over the Internet. Schedule 175 in FIG. 2 is exemplary. Other formats for schedule 175 could easily be employed.

At the top of schedule 175 is a header identifying the subscriber name ("XYZ Corp.") 215. A date window 220 is provided identifying the date ("Mar. 15, 2001") for when the service person is to make the visits. A list of site visits 225 is provided. The appointment time is provided in expected time 230. Expected time 230 is depicted in military time, but could easily be provided in conventional a.m./p.m. format. The street address is provided in street address window 235. Street address window 235 could easily provide city and/or state and/or zip code information for subscribers servicing multiple cities and/or multiple states. Finally, the coordinate pairs corresponding to the street addresses are provided in coordinate pair window 240.

Coordinate pairs 240 are depicted in longitude/latitude format, although they could alternatively be provided in an X-Y Cartesian format. Moreover, as discussed above, subscriber 185 could provide these coordinate pairs or, alternatively, they could be generated by the wireless carrier by accessing a street address conversion database 160.

Returning to FIG. 1, central processor 165 also receives location data from location system 155. This location data, which may be calculated using any of the techniques described above (TDOA, AOA, TDOA/AOA, GPS, etc.), characterizes the location of a particular PWD 180 carried by the service person. This location data may be acquired by location system 155 on a periodic basis having a period such as: 5 minutes; 10 minutes; 15 minutes; 20 minutes; 30 minutes; 40 minutes; 45 minutes; 50 minutes; or 60 minutes. Other values for the period could be selected. Alternatively, a location prediction algorithm might be employed that predicts when PWD 180 is approaching or near a predetermined site based on past location data values and, possibly, computed velocity. Accordingly, rather than acquiring location data at a fixed periodic rate, location system 155 would time its acquisition based on whether PWD 180 is predicted to be near a predetermined site. The coding of such a prediction algorithm is also well within the skill of the ordinary artisan.

Wireless carriers employing a network-based localization technique may have to cause PWD 180 to transmit so the location data can be acquired. Recall that the TDOA, AOA, TDOA/AOA, LPM techniques rely on a transmission being received by transceivers 140 from PWD 180. In the E911 context, PWD 180 is by definition transmitting (a 911 call is being made). The collection of raw localization data at MTSO 130 and subsequent processing by location system 155 can be triggered by the 911 called number. In the context of the present location visit confirmation service, PWD 180 may be caused to transmit so that it can be localized.

One approach would be to require the service person to dial into a number for some period before, during, and after a site visit. For example, the service person might be required to begin the call 15 minutes before the site visit and end the call 15 minutes thereafter. Another solution would be to require the service person to make such a call on a more or less regular basis, such as every 5–10 minutes. In either case, the call might be made to a special number in cellular network 100 or some other number that would cause MTSO 130 and location system 155 to commence their data acquisition and processing operations. In other words, the called number could function as a trigger for MTSO 130 and location system 155 to commence their respective operations related to localization.

A more satisfactory approach would be to equip PWD 180 with a timer that causes it to transmit automatically. Either subscriber 185 or cellular network 100 could load schedule data or issue commands that cause PWD 180 to transmit at the appointed times.

If the wireless carrier employs a handheld localization technique, such as GPS, the above issue still exists. PWD 180 may receive the GPS transmissions and perform the GPS computation to calculate the coordinate pair on a regular basis. However, until PWD 180 initiates a transmission to cell site 140/MTSO 130, the coordinate pair is unavailable to central processor 165. The solutions discussed in the above paragraph could be employed to address this issue in a GPS-based localization scheme.

Another approach is the reverse of what has been suggested. Rather than having PWD 180 "push" coordinates to cellular network 100, cellular network 100 can "pull" the information from PWD 180. For example, cellular network 100 may initiate a call to PWD 180. Once the connection is made, PWD 180, of course, will be transmitting. In this approach, central processor 165 would pull from PWD 180 at the appropriate times based on the periodic polling or the prediction algorithm polling described above.

One advantage of having a special number (or numbers) dedicated for obtaining the location of PWD 180 is that the special number(s) can be used as a cue or control signal for MTSO 130 and location system 155 to commence their operations related to localization. This may be especially beneficial where the wireless carrier relies on service person-initiated polling. For example, special numbers 919-555-5500 through 919-555-6000 might be dedicated for localization operations related to the site visit confirmation service. Concurrently, the 911 number is dedicated to emergency services. When it detects a 911 called number, MTSO 130 acquires location data to be forwarded to location system 155 for processing, the result of which is forwarded to ALI dB 125 for use by the emergency system. When it detects a site visit confirmation service called number (919-555-5000 through 919-555-6000), MTSO 130 acquires location data to be forwarded to location system 155 for processing, the result of which is forwarded to central processor 165 for use by the site visit confirmation system.

Whether transmission by PWD 180 is initiated by the service person or by central processor 165, the calling number (MIN and/or ESN) of PWD 180 should be made available to central processor 165 so that the specific PWD 180 can be identified. Accordingly, schedule 175 of FIG. 1 and the exemplary schedule of FIG. 2 may include this calling number.

Returning to FIG. 1, the coordinate pairs of the location data describing the position of PWD 180 are received by central processor 165 from location system 155. Central processor 165 then compares the coordinate pairs of PWD 180 to the coordinate pairs 240 of the predetermined sites in the schedule. The comparison may comprise a distance computation. For example, the coordinate pair describing the position of PWD 180 is La, Lb. The distance between position La, Lb and position L1, L2 of a predetermined site 240 can now be computed. The distance between La, Lb and the positions corresponding to the other predetermined sites 240 (L3, L4; L5, L6; . . . L13, L14) can also be computed. If the distance between position La, Lb and the coordinates of one of predetermined visit sites is less than a distance threshold (e.g., 100 m), central processor 165 determines that the predetermined site visit was made. In other words, a confirmation is made by the wireless carrier.

It should be noted that the above determination may also consider time as a variable in two respects. First, central processor 165 might not compare a coordinate pair La, Lb of PWD 180 to every predetermined site in schedule 175, as was suggested above. Instead, central processor 165 may make the comparison only to predetermined sites having an expected time 230 (FIG. 2) that falls within a window of the present time. For example, assume that a time window of three hours (i.e., 1.5 hours before and 1.5 hours after the present time) is employed. Thus, if the position La, Lb of PWD 180 is received at 1100 hours (11:00 a.m.), only predetermined sites having an expected time between 0930–1230 (9:30 a.m.–12:30 p.m.) are considered. Thus, the distance computation and threshold comparison would be made only for site 2 through site 4 on FIG. 2.

The second regard in which time can be considered relates to how long a service person is present at a predetermined site. Central processor 165 might require that PWD 180 be present at the site (i.e., the computed distance is less than the distance threshold) for a period of time exceeding a time threshold (e.g., 15 minutes or 30 minutes). If PWD 180 is computed to be at the site for a time period less than the time threshold, it can be assumed that the service person merely passed by or only stopped momentarily without completing the service call.

Once the monitoring of the service person by the wireless carrier is complete, data describing the comparisons is saved by central processor 165. This data may be transmitted (via paper mail, e-mail, the Internet, etc.) under the control of central processor 165 to subscriber 185 so that subscriber 185 can prepare an appropriate visit confirmation report. Alternatively, report generator module 170 can access this data from central processor 165 in order to format a summary report to be forwarded (via paper mail, e-mail, the Internet, etc.) to subscriber 185.

FIG. 3 provides an exemplary visit confirmation summary report. Data windows 310–340, which are similar to data windows 215–240 of FIG. 2, include title window 310, date window 315, site visit list 320, site address list 325, site position list 330, and expected time 340. Visit confirmation window 345 indicates whether central processor 165 confirmed a site visit for each of the sites in schedule 175. Time window 350 indicates the time the confirmation was made. In an alternative embodiment, time window 350 might provide the length of time that PWD 180 was determined to be present at the site. For example, the entry in window 350 for site 1 might be 0817-0832.

Figure 4:
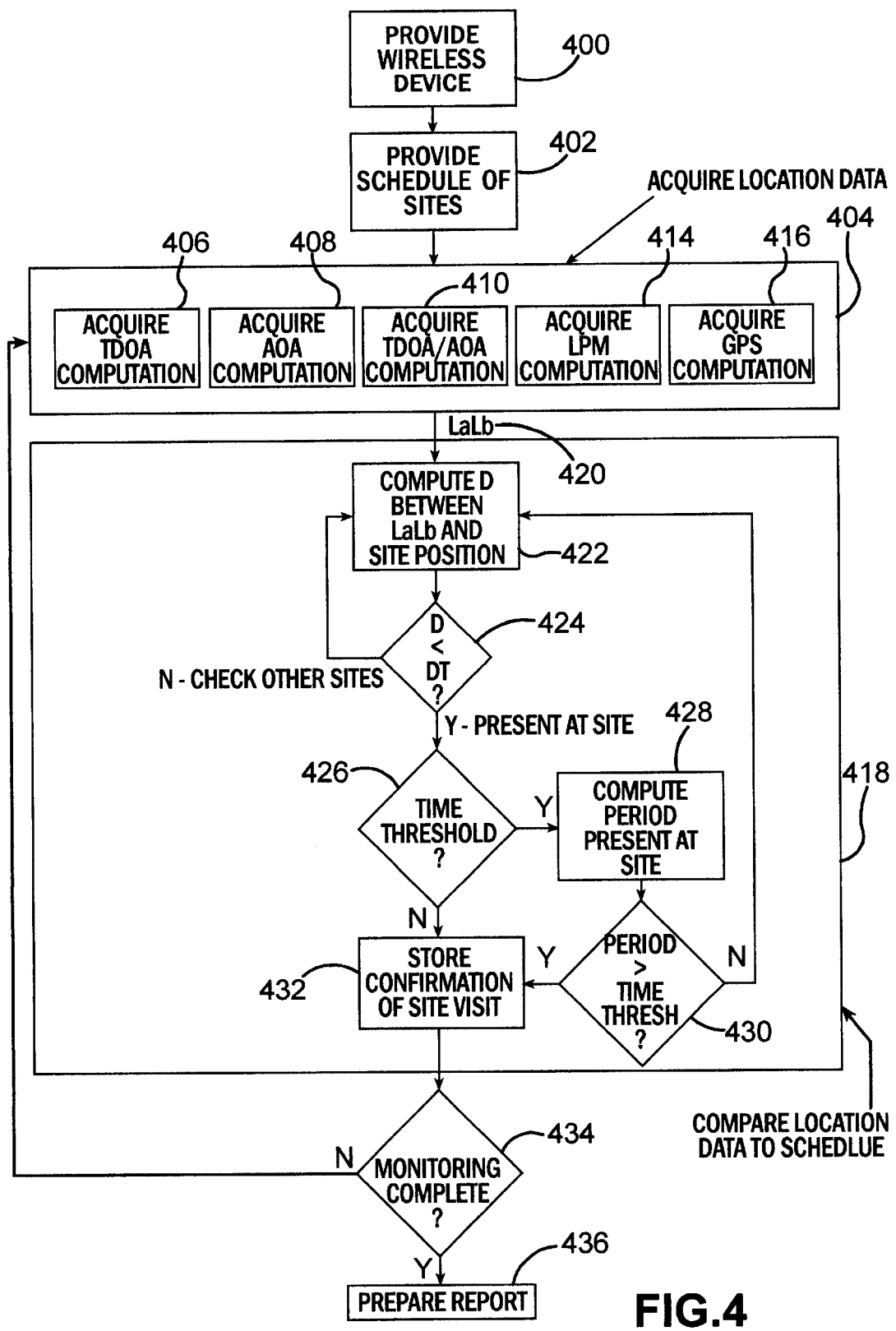
FIG. 4 is an exemplary flow diagram according to an embodiment of the invention for providing site visit confirmation.

The flow diagram of FIG. 4 illustrates a method according to an embodiment of the invention for confirming site visits. Portable wireless devices are provided, as in 400. A schedule of sites is provided as in 402. As previously discussed, the coordinate pairs for the sites may be converted from street addresses by the wireless carrier or by the subscriber. Next, location data is acquired, as in step 404. As previously discussed, the location data may be acquired using a TDOA computation, as in step 406; a AOA computation, as in step 408; a TDOA/AOA computation, as in step 410; an LPM computation, as in step 414; or a GPS computation, as in step 416. Other localization techniques could be employed.

The output of the acquire location data step 404 is a coordinate pair LaLb 420 (or it could be an X-Y pair, as previously discussed).

According to 418, central processor 165 compares the location data to the schedule data. The comparison of location data to schedule data could be implemented several different ways, as previously discussed. In the embodiment depicted by FIG. 4, the distance D between LaLb and a site position (e.g., L1, L2 of FIG. 2 for site 1) is computed, as in 422. The distance D is compared to a distance threshold DT (e.g., 25 m, 50 m, 100 m, 150 m, etc.) to determine if PWD 180 is present at the site. If not, distances to other site positions in the schedule are computed as the method returns to 422. Although not illustrated here, central processor 165 could include logic such that only those sites within an appropriate time window are considered, as previously discussed.

If the computed distance D is less than distance threshold DT, then PWD 180 is considered to be present at the site under consideration ("Y" of decision block 424). Next, at decision block 426, the method proceeds to 428 if a time threshold is to be considered. At block 428, central processor 165 computes the period during which PWD 180 has been present at the site under consideration. Although not depicted in FIG. 4, block 428 entails receiving one or more additional coordinate pairs LaLb for the position of PWD 180, computing the distance D to the site under consideration, and comparing D to the distance threshold DT to determine if PWD 180 is still present at the site. If PWD 180 is determined to be present at the site for a period greater than the time threshold, as in the "Y" branch of 430, the site visit is considered confirmed. If the time threshold is not satisfied, as in the "N" branch of 430, the site visit is not considered confirmed and the method returns to 422 for consideration of other sites in the schedule.

If the time threshold is satisfied ("Y" of block 430), or if a time threshold is not to be considered ("N" of block 426), a confirmation of the site visit is stored at 432. If monitoring is not yet complete ("N" of decision block 434), the method returns to block 404 for acquisition of additional location data. If monitoring is complete ("Y" of decision block 434), a summary report is prepared at block 436.

A location visit details service is now disclosed for a wireless carrier to track service personnel in order to prepare a service person track report. Referring back to FIG. 1, one of several available localization techniques (e.g., TDOA, AOA, TDOA/AOA, LPM, GPC, and so forth) is used by location system 155 to compute a location for a PWD 180 carried by a service person. In this embodiment of the invention, location system 155 polls (initiates a call with) PWD 180 on a periodic basis, such as every 1 minute; 2 minutes; 3 minutes; 4 minutes; 5 minutes; 10 minutes; 15 minutes; 20 minutes; 30 minutes; 40 minutes; 50 minutes; or 60 minutes. Other periods for polling could be selected. Each time PWD 180 is polled, a location is computed by localization system 155.

The location is passed from location system 155 to central processor 165, which organizes the location data into position and time data pairs. The time data, which might include a date, is supplied either by location system 155 or by central processor 165, which might have its own internal clock.

In a first embodiment, central processor 165 accesses a database in order to convert the coordinate pairs (the position data could be latitude/longitude or X-Y Cartesian pairs) to street addresses, such as geographic information system (GIS) database 160.

In a second embodiment, central processor 165 need not perform conversion of the coordinate pairs because they are going to be provided without corresponding street addresses. In this second embodiment, subscriber 185 can perform such a conversion it is desired.

Once the monitoring period is complete, central processor 165 can pass the aggregated position data, time data, and street address data (if a conversion was made) to a report generator module 170. Report generator module 170 prepares a service person track report including the details for that service day. The service person track report could be transmitted to subscriber 185 in various manners, including paper mail, e-mail, the Internet, and so forth. Alternatively, the aggregated position data, time data, and street address data (if a conversion was made) could be transmitted (via paper mail, e-mail, the Internet, etc.) to subscriber 185, which could maintain its own report generator module 170 (not shown) for creating the track report.

Having described the general operation of an exemplary system for a location visit details service, it should be appreciated that the various components discussed above represent a functional allocation of logical points in the system. In other words, these components could easily be combined or further subdivided without departing from the spirit and scope of the invention. For example, report generator module 170, central processor 165, and location system 155 could easily be combined to be part of MTSO 130.

The service person track report could be used by subscriber 185 for preparing a bill. For example, if the track report indicates that a service person was present at 75 Ninth Street for 2.25 hours, the customer is billed accordingly. Alternatively, the service person track report can be used to gather efficiency statistics on the service person or on a group of service persons. Subscriber 185 can compute the average time to install a carpet, clean a carpet, install a cable box, and so forth, for both individuals and the workforce as a whole.

Additionally, it should be noted that this embodiment of the invention (service visit details) could be combined or integrated with the previous embodiment of the invention (service visit confirmation). In this combined embodiment, a schedule of predetermined visits 175 is input to central processor 165. Central processor 165 compares received location data to the schedule, as previously described, in order to confirm whether site visits have been made. According to this combined embodiment, central processor 165 would, additionally, store the location data and convert it to street address data. This way, central processor 165 would store both confirmation data and track details data to permit the generation of a combined track and confirmation report.

Figure 5:
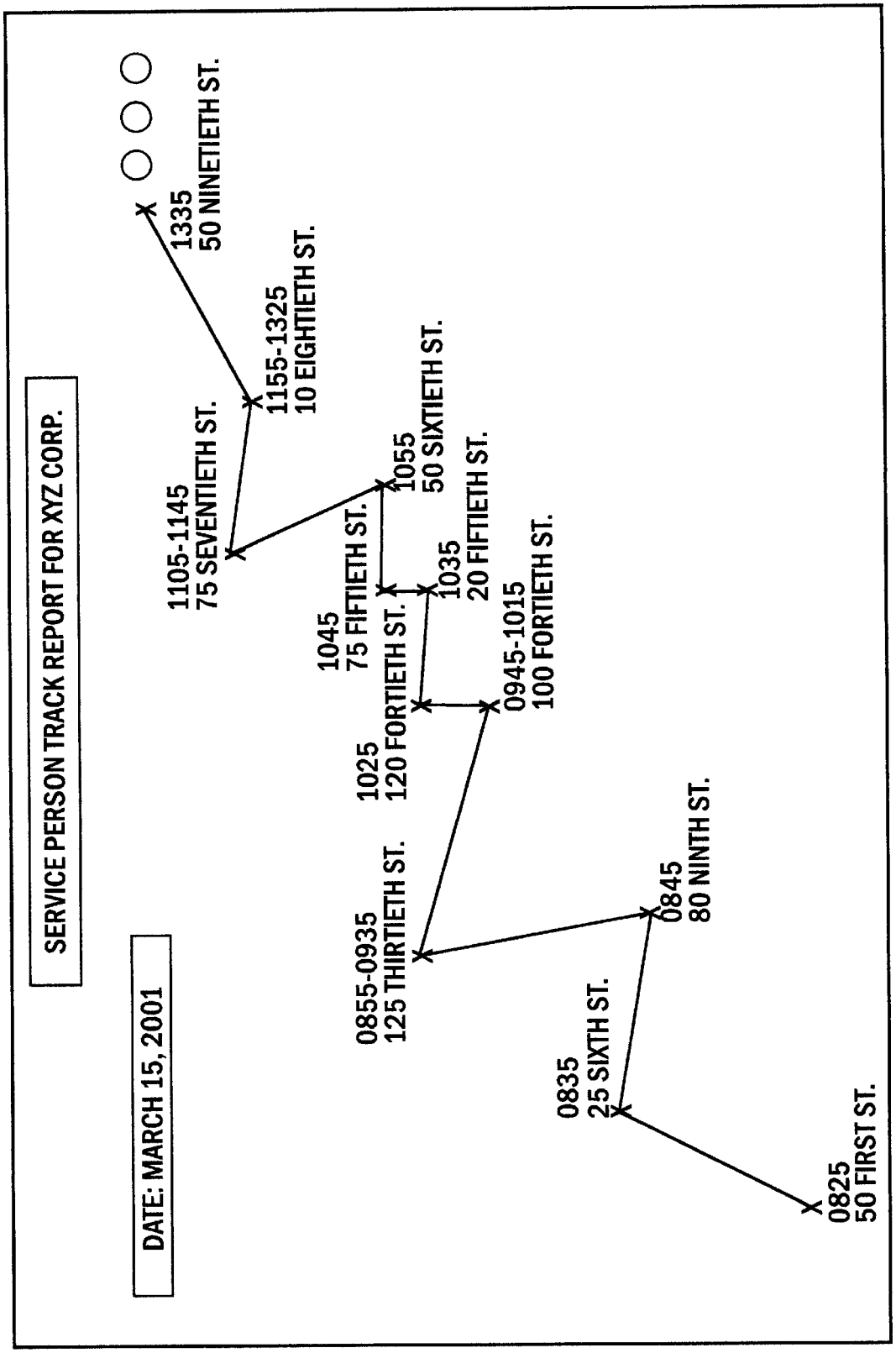
FIG. 5 is an exemplary service person track report according to an embodiment of the invention.

An exemplary service person track report is depicted by FIG. 5. The service person track report of FIG. 5 could be overlayed onto a map to provide context.

The combined embodiment discussed above (site visit confirmation and site visit details) could be presented as a combination of FIG. 3 and FIG. 5. For example, the site visit confirmation data (of FIG. 3) could be presented in a window adjacent to the site visit details data (of FIG. 5). Alternatively, the combined report might be presented in the format of FIG. 5. Tracking data for each location computed for PWD 180 would be presented as in FIG. 5. Additionally, the street address points corresponding to the schedule of predetermined sites would be included on the display. Where a site visit confirmation was made, the street address point will be underscored, color-coded, or otherwise marked for emphasis. Street address points corresponding to sites that were not confirmed may be emphasized in an alternative fashion.

Figure 6:
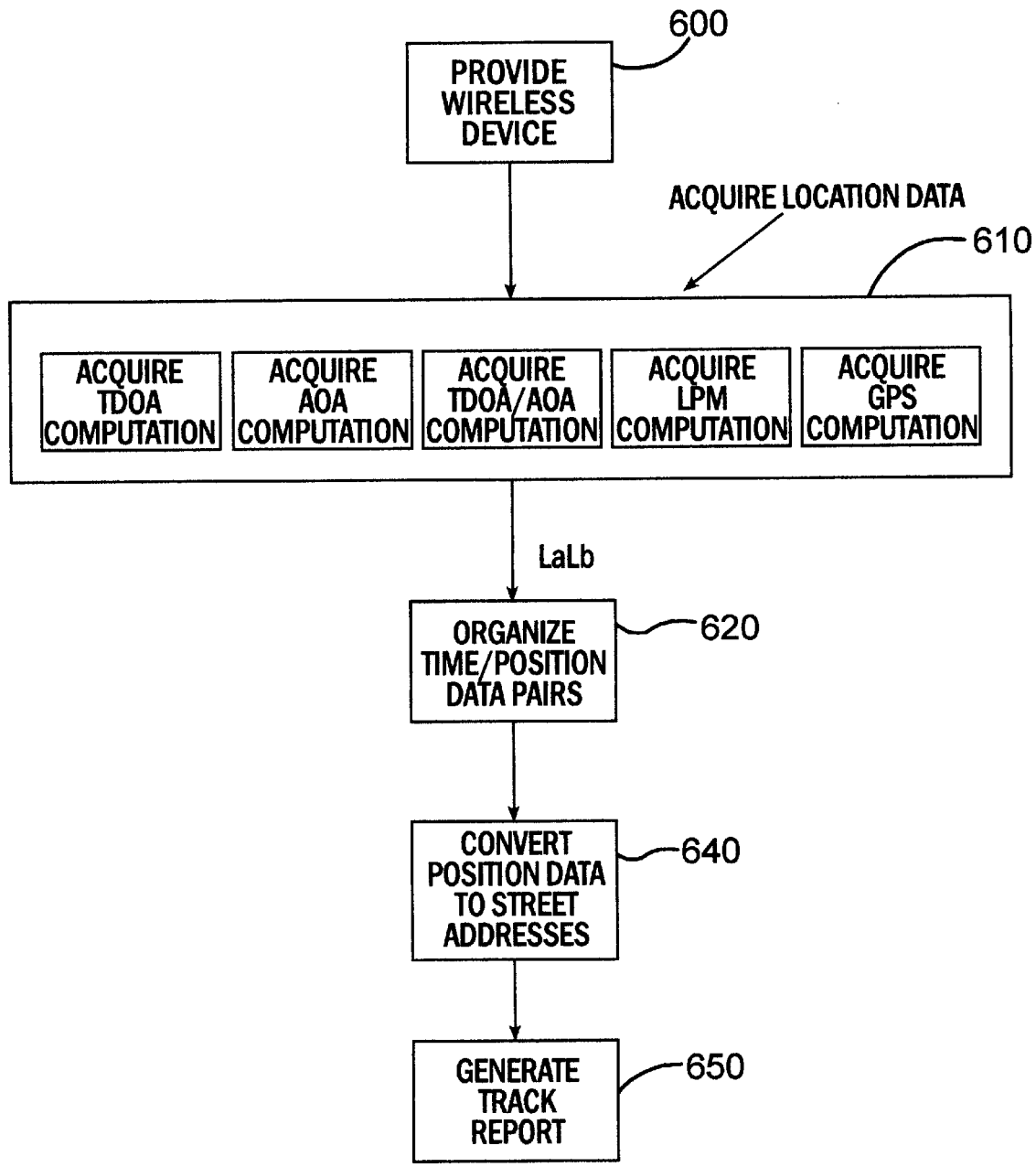
FIG. 6 is an exemplary flow diagram according to an embodiment of the invention for providing site visit details.

FIG. 6 is an exemplary flow diagram according to an embodiment of the invention for providing site visit details for a service person. A wireless device is provided to a service person, as in 600. Location data describing the location of the wireless device is provided at 610. As previously discussed, location data could be based on the various localization techniques including TDOA, AOA, TDOA/AOA, LPM and GPS. At 620, the location data is organized into time and position data pairs. At 640, the position data may be converted to street addresses. Step 640 may be skipped, as discussed above. At 650, a track report is generated for the subscriber.

Having described methods and apparatus for a site visit confirmation service and a site visit details service, it should be apparent to the artisan of ordinary skill that numerous advantages flow from the invention. The location visit confirmation service permits a subscriber to confirm scheduled site visits in a manner that is accurate and independent of the service person. Additionally, the confirmation is largely automated and places little burden on the subscriber home office, the service person, and the customer. Moreover, the service enables the identification of missed appointments and the identification of problem employees without depending on customer complaints. Thus, problems can be addressed before customer complaints are lodged and goodwill is lost. The location visit details service includes the above advantages. This service also has the advantage of providing a summary report can be used for preparation of bills or for gathering statistics on efficiency.

Embodiments of systems and methods for have been described. In the foregoing description, for purposes of explanation, numerous specific details are set forth to provide a thorough understanding of the present invention. It will be appreciated, however, by one skilled in the art that the present invention may be practiced without these specific details. Additionally, in the foregoing detailed description, the present invention has been described with reference to specific exemplary embodiments. These specific embodiments are intended to exemplary only and, accordingly, the present specification and figures are to be regarded as illustrative rather than restrictive.

What is claimed is:

1. A system for confirming visits to sites, comprising:
   a portable wireless device;
   a schedule of predetermined sites to be visited by a service person associated with the portable wireless device on behalf of a subscriber;
   a location identification means for acquiring location data of the portable wireless device; and
   a processor for comparing a position based on the location data to the schedule in order to confirm whether a predetermined site has been visited by the service person.

2. The system of claim 1, wherein the location identification means acquires the location data based on the detection of a dedicated phone number.

3. The system of claim 2, wherein the detection of a dedicated phone number is performed by a mobile telephone switching office.

4. The system of claim 1, further comprising a mobile telephone switching office adapted to detect a dedicated phone number and an emergency phone number.

5. The system of claim 4, wherein location data is sent to a first device when the dedicated phone number is detected, and wherein location data is sent to a second device when the emergency phone number is detected.

6. The system of claim 5, wherein the second device is one of a public service answering point, an emergency services router, and a database coupled to a public service answering point, and wherein the first device is said processor.

7. The system of claim 1, wherein the location identification means performs a network-based time difference of arrival (TDOA) computation.

8. The system of claim 1, wherein the location identification means performs a network-based angle of arrival (AOA) computation.

9. The system of claim 1, wherein the location identification means computes the location data based on a combination of time difference of arrival (TDOA) and angle of arrival (AOA) computations.

10. The system of claim 1, wherein the location identification means performs a location pattern matching (LPM) computation.

11. The system of claim 1, wherein the location identification means computes the location data by performing a global positioning system (GPS) computation.

12. A system for confirming visits to sites, comprising:
    a portable wireless device;
    a schedule of predetermined sites to be visited by a service person associated with the portable wireless device, wherein the schedule of predetermined sites comprises a series of X-Y pairs or latitude-longitude pairs;
    means for acquiring location data of the portable wireless device; and
    a processor for comparing a position based on the location data to the schedule in order to confirm whether a predetermined site has been visited by the service person.

13. The system of claim 12, wherein the schedule is created by converting a plurality of street addresses to the series.

14. The system of claim 13, wherein the conversion is performed by accessing a geographic information system (GIS).

15. The system of claim 12, further comprising a report generator module for generating a report identifying the predetermined sites from the schedule that were visited by the service person.

16. The system of claim 12, wherein comparisons performed by the processor are based on a threshold.

17. The system of claim 16, wherein the threshold comprises a distance.

18. The system of claim 17, wherein the threshold comprises a distance and a time.

19. The system of claim 12, wherein the means for acquiring location data of the portable wireless device acquires the location data on a periodic basis.

20. The system of claim 12, wherein the means for acquiring location data of the portable wireless device acquires the location data based on a prediction algorithm that predicts when the service person is near one of the predetermined sites in the schedule.

21. A method for confirming visits to sites, comprising:
    providing a portable wireless device to a service person;
    providing a schedule of predetermined sites to be visited by the service person on behalf of a subscriber;
    acquiring location data of the portable wireless device; and
    comparing a position based on the location data to the schedule in order to confirm whether a predetermined site has been visited by the service person.

22. The method of claim 21, further comprising detecting a specific phone number associated with tracking service persons, and wherein acquiring location data is based on detection of said phone number.

23. The method of claim 22, wherein detecting a specific phone number associated with tracking service persons is performed by a mobile telephone switching office.

24. The method of claim 23, wherein the mobile telephone switching office performs the additional step of detecting an emergency phone number.

25. The method of claim 24, wherein the location data is forwarded to a first device when the specific phone number is detected and the location data is forwarded to a second device when the emergency phone number is detected.

26. The method of claim 25, wherein the first device is a processor that performs said comparing and the second device is one of a public service answering point, an emergency services router, and a database coupled to a public service answering point.

27. The method of claim 21, wherein acquiring location data comprises performing a network-based time difference of arrival (TDOA) computation.

28. The method of claim 21, wherein acquiring location data comprises performing a network-based angle of arrival (AOA) computation.

29. The method of claim 21, wherein acquiring location data comprises performing a network-based time difference of arrival (TDOA) and a network-based angle of arrival (AOA) computation.

30. The method of claim 21, wherein acquiring location data comprises performing a location pattern matching (LPM) computation.

31. The method of claim 21, wherein acquiring location data comprises performing a global positioning system (GPS) computation.

32. The method of claim 31, wherein the portable wireless device includes a GPS receiver.

33. The method of claim 32, wherein the GPS computation is performed by the portable wireless device.

34. The method of claim 32, wherein the GPS computation is performed by a processor.

35. A method for confirming visits to sites, comprising:
providing a portable wireless device to a service person;
providing a schedule of predetermined sites to be visited by the service person on behalf of a subscriber, wherein the schedule comprises a series of X-Y pairs or latitude-longitude pairs;
acquiring location data of the portable wireless device; and
comparing a position based on the location data to the schedule in order to confirm whether a predetermined site has been visited by the service person.

36. The method of claim 35, wherein the schedule is created by converting a plurality of street addresses to the series.

37. The method of claim 36, wherein the conversion is performed by accessing a geographic information system (GIS).

38. The method of claim 35, further comprising generating a report describing whether the predetermined sites in the schedule were visited by the service person.

39. The method of claim 35, wherein comparing a position based on the location data to the schedule is based on a threshold.

40. The method of claim 39, wherein the threshold comprises a distance.

41. The method of claim 39, wherein the threshold comprises a distance and a time.

42. The method of claim 35, wherein acquiring location data occurs on a periodic basis.

43. The method of claim 35, wherein acquiring location data occurs at a time based on a prediction algorithm that predicts the movement of the service person.

44. A system for confirming visits to sites, comprising:
a memory storing a schedule of predetermined sites to be visited by a service person on behalf of a subscriber, the service person having a portable wireless device;
a first processing module for acquiring location data of the portable wireless device;
a second processing module for comparing a position based on the location data to the schedule in order to confirm whether a predetermined site has been visited by the service person.

45. The system of claim 44, wherein the first processing module and the second processing module are located in a wireless carrier network.

46. The system of claim 44, wherein the first processing module is located in the wireless device.

47. The system of claim 44, wherein the first processing module performs one or more of the following computations: time difference of arrival (TDOA); angle of arrival (AOA);
location pattern matching (LPM), and global positioning system (GPS).

48. The system of claim 44, wherein the schedule is based on the conversion of a plurality of street addresses to a series of X-Y pairs or longitude-latitude pairs.

49. The system of claim 48, wherein the conversion is performed by the subscriber.

50. The system of claim 48, wherein the conversion is performed by a wireless carrier.

51. The system of claim 44, wherein the comparison performed by the second processing module is based on a threshold.

52. The system of claim 51, wherein the threshold comprises a distance.

53. The system of claim 51, wherein the threshold comprises a distance and a time.

54. The system of claim 44, wherein the first processing module is adapted to acquire the location data based on a time period or a prediction algorithm.

55. A system for confirming visits to sites, comprising:
means for providing two-way communications, said means being carried by or with a service person;
a schedule of predetermined sites to be visited by the service person;
means for acquiring location data of the means for providing two-way communications; and
means for comparing a position based on the location data to at least one of the predetermined sites in order to determine if the at least one predetermined site was visited by the service person.

56. The system of claim 55, wherein the means for providing two-way communications comprises a cell phone, a two-way pager, or a personal data assistant.

57. The system of claim 55, wherein the means for acquiring location data is a processor that performs a location computation.

58. The system of claim 57, wherein the location computation comprises one or more of a global positioning system (GPS) computation, a time difference of arrival (TDOA) computation, an angle of arrival (AOA) computation, and a location pattern matching (LPM) computation.

59. The system of claim 55, wherein the schedule of predetermined sites comprises coordinate pairs in longitude/latitude format or Cartesian format.

60. The system of claim 59, wherein the means for comparing comprises a processor that compares the position to a coordinate pair corresponding to one of the predetermined sites.

* * * * *